United States Patent [19]

Scheibli et al.

[11] Patent Number: 5,047,514
[45] Date of Patent: Sep. 10, 1991

[54] BIREACTIVE PRIMARY DISAZO DYES CONTAINING 1-AMINO-8-HYDROXYNAPHTHALENE-3,6 DISULFONIC ACID AS COUPLING COMPONENT

[75] Inventors: Peter Scheibli, Bottmingen; Karl Seitz, Oberwil, both of Switzerland

[73] Assignee: Ciba-Geigy Corporation, Ardsley, N.Y.

[21] Appl. No.: 116,963

[22] Filed: Nov. 5, 1987

Related U.S. Application Data

[60] Division of Ser. No. 898,797, Aug. 20, 1986, Pat. No. 4,713,082, which is a continuation of Ser. No. 771,127, Aug. 30, 1985, abandoned.

[30] Foreign Application Priority Data

Aug. 30, 1984 [CH]  Switzerland ...................... 4154/84-3

[51] Int. Cl.[5] .................... C09B 62/08; C09B 62/085; D06P 1/382; D06P 3/66
[52] U.S. Cl. .................................. 534/637; 534/582; 534/588; 534/593; 534/594; 534/598; 534/600; 534/617; 534/618; 534/632; 534/634; 534/635; 534/636; 534/638; 534/642; 534/887; 540/133; 552/232
[58] Field of Search ............... 534/632, 634, 635, 636, 534/637, 638, 617

[56] References Cited

U.S. PATENT DOCUMENTS

| 4,377,517 | 3/1983 | Mislin et al. | 534/638 |
| 4,425,270 | 1/1984 | Yamada et al. | 534/642 |
| 4,431,584 | 2/1984 | Kaack et al. | 534/638 |
| 4,515,598 | 5/1985 | Meininger et al. | 8/549 |
| 4,649,193 | 3/1987 | Meininger et al. | 534/637 |

FOREIGN PATENT DOCUMENTS

| 0040790 | 12/1981 | European Pat. Off. | 534/638 |
| 0069376 | 1/1983 | European Pat. Off. | 534/622 |
| 0079563 | 5/1983 | European Pat. Off. | 534/622 |
| 0084849 | 8/1983 | European Pat. Off. | 534/622 |
| 3113473A1 | 2/1982 | Fed. Rep. of Germany | 534/637 |
| 3202120-A | 7/1983 | Fed. Rep. of Germany | 534/622 |
| 45-10789 | 4/1970 | Japan | 534/642 |
| 57-57754 | 4/1982 | Japan | 534/642 |

*Primary Examiner*—Mary C. Lee
*Assistant Examiner*—Fiona T. Powers
*Attorney, Agent, or Firm*—Wenderoth, Lind & Ponack

[57] ABSTRACT

Reactive dyes which contain at least one radical of the formula

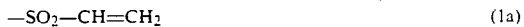

or

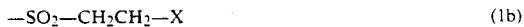

and at least one radical of the formula

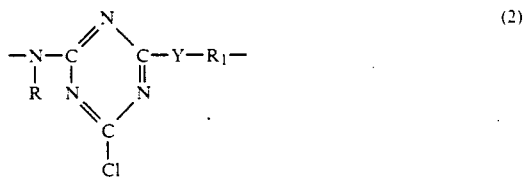

in which X is an inorganic or organic radical detachable under alkaline conditions, R is hydrogen or substituted or unsubstituted $C_{1-4}$-alkyl, Y is oxygen or sulfur and $R_1$ is a substituted or unsubstituted aliphatic radical, give dyeings or prints having good fastness properties.

3 Claims, No Drawings

BIREACTIVE PRIMARY DISAZO DYES CONTAINING 1-AMINO-8-HYDROXYNAPHTHALENE-3,6 DISULFONIC ACID AS COUPLING COMPONENT

This application is a division of application Ser. No. 898,787, filed Aug. 20, 1986 (now U.S. Pat. No. 4,713,082), which application is, in turn, a continuation of now abandoned application Ser. No. 771,127, filed Aug. 30, 1985.

The present invention relates to the technical field of the use of reactive dyes for dyeing or printing textile fibre materials.

Reactive dyes have long been widely used for dyeing and printing textiles made of fibre materials. In view of the rising demands on reactive dyeings with respect to economics, application technology and fastness level, the technical standard reached, however, is frequently not fully satisfactory.

The present invention has for its object to find a new, improved process for dyeing or printing textile materials with reactive dyes which leads to fast dyeings and prints.

The present invention provides a new process which meets the stated demands.

The process comprises using reactive dyes which contain at least one radical of the formula $$-SO_2-CH=CH_2 \quad (1a)$$

or $$-SO_2-CH_2CH_2-X \quad (1b)$$

and at least one radical of the formula

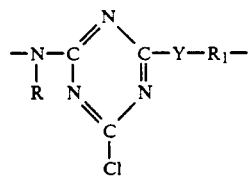

(2)

in which X is an inorganic or organic radical detachable under alkaline conditions, R is hydrogen or substituted or unsubstituted $C_{1-4}$-alkyl, Y is oxygen or sulfur and $R_1$ is a substituted or unsubstituted aliphatic radical, and the dye is a metal-free monoazo or secondary disazo dye, a primary disazo dye in which the diazo component to which a radical of the formula (2) is bonded is coupled in the ortho-position to an amino group, or an anthraquinone, phthalocyanine, formazan, azomethine, dioxazine, phenazine, stilbene, triphenylmethane, xanthene, thiocanthone, nitroaryl, naphthoquinone, pyrenequinone or perylenetetracarbimide dye, except compound No. 7 in Table 2 of JP-A-45-010,789.

The radical X in formula (1b) is for example a halogen atom, such as fluorine, chlorine or bromine, a sulfato, thiosulfato, phosphato, acetoxy or propionoxy group or the like.

An alkyl radical R in the formula (2) can be a straight-chain or branched alkyl radical which can also be substituted, for example by halogen, hydroxyl, cyano or sulfo. Examples of R are: methyl, ethyl, propyl, isopropyl, butyl, isobutyl, sec.-butyl, tert.-butyl, β-chloroethyl, β-hydroxyethyl, β-hydroxybutyl, β-cyanoethyl, sulfomethyl or sulfoethyl.

The radical $R_1$ is an alkyl radical which is straight-chain or branched, which preferably has 1 to 7 carbon atoms and which can be further substituted, for example by halogen, hydroxyl, cyano, alkoxy, carboxyl or sulfo, or an unsubstituted alkyl radical having 7 to 20 carbon atoms or a cyclohexyl radical. The radical $R_1$ can also contain as substituent a reactive radical, for example a vinylsulfonyl or halogenotriazinyl radical, which is bonded directly by a bridge member, for example an amino group or an aromatic or heterocyclic radical, to an aliphatic C atom of $R_1$.

Examples of $R_1$ are the following substituents: methyl, ethyl, propyl, isopropyl, butyl, isobutyl, sec.-butyl, tert.-butyl, pentyl, hexyl, nonyl, dodecyl, hexadecyl, pentadecyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-chloropropyl, γ-bromopropyl, sulfomethyl, β-sulfoethyl or cyclohexyl. Preference is given to unsubstituted alkyl radicals having 1 to 4 carbon atoms.

In the process according to the invention, preference is given to using:

a) reactive dyes of the formula

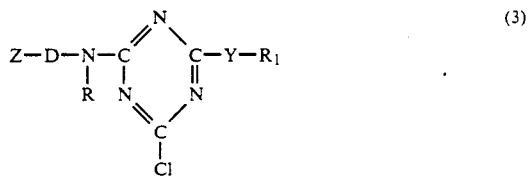

(3)

in which Z is a radical of the formula

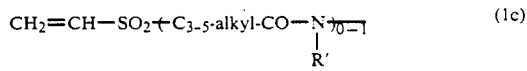

(1c)

or

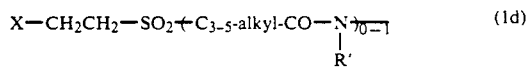

(1d)

and R' is hydrogen or substituted or unsubstituted $C_{1-4}$-alkyl, and R, Y, $R_1$ and X are as defined above, and D is a dye radical from one of the abovementioned classes.

b) Reactive dyes of the formula (3) in which D is as defined in a), R is hydrogen, methyl or ethyl, Y is oxygen or sulfur, and $R_1$ is $C_{1-4}$-alkyl or $C_{1-4}$-alkoxy-$C_{1-4}$-alkyl.

c) Reactive dyes of the formula (3) in which D is the radical of a monoazo or disazo dye.

d) Reactive dyes of the formula

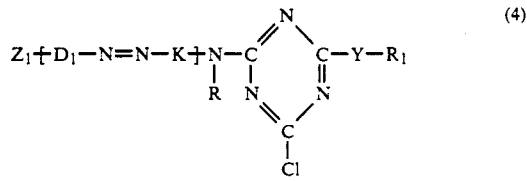

(4)

in which $D_1$ is the radical of a diazo component of the benzene or naphthalene series, K is the radical of a coupling component of the benzene or naphthalene series or of the heterocyclic series, $Z_1$ is vinylsulfonyl, β-chloroethylsulfonyl, β-sulfatoethylsulfonyl, β-acetoxyethylsulfonyl or β-chloroethylsulfonylbutyrylamino, R is hydrogen, methyl or ethyl, Y is oxygen or sulfur and $R_1$ is $C_{1-4}$-alkyl or $C_{1-4}$-alkoxy-$C_{1-4}$-alkyl.

e) Reactive dyes of the formula

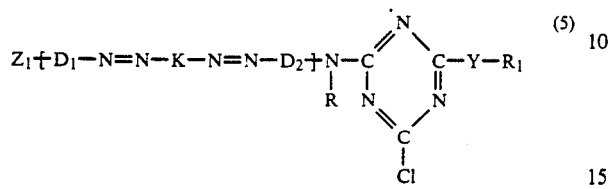

in which $D_1$ and $D_2$ are each a radical of a diazo component of the benzene or naphthalene series, K is the radical of a coupling component of the naphthalene series, $Z_1$ is vinylsulfonyl, β-chloroethylsulfonyl, β-sulfatoethyl sulfonyl, β-acetoxyethylsulfonyl or β-chloroethylsulfonylbutyrylamino, R is hydrogen, methyl or ethyl, Y is oxygen or sulfur, and $R_1$ is $C_{1-4}$-alkyl or $C_{1-4}$-alkoxy-$C_{1-4}$-alkyl.

In particular, there are provided reactive dyes of the formula

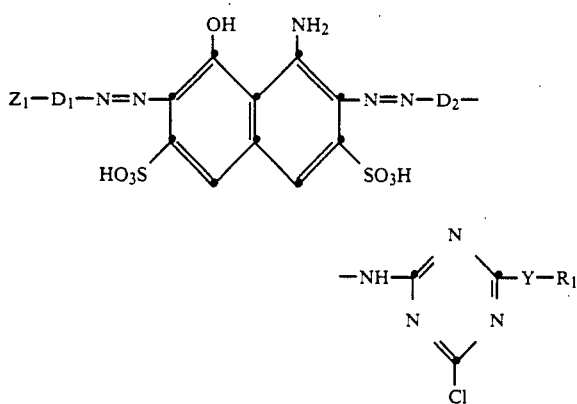

in which $D_1$ and $D_2$ are each phenylene unsubstituted or substituted by sulfo, $Z_1$ is vinylsulfonyl, β-chloroethylsulfonyl, β-sulfatoethylsulfonyl, β-acetoxyethylsulfonyl or β-chloroethylsulfonylbutyrylamino, Y is sulfur, and $R_1$ is $C_1$-$C_4$-alkyl or $C_1$-$C_4$-alkoxy-$C_1$-$C_4$-alkyl.

The radical D in the formula (3) can be substituted in conventional manner, in particular by one or more sulfo groups. Examples of further substituents on the radical D are alkyl groups having 1 to 4 carbon atoms, such as methyl, ethyl, propyl, isopropyl and butyl, alkoxy groups having 1 to 4 carbon atoms, such as methoxy, ethoxy, propoxy, isopropoxy and butoxy, acylamino groups having 1 to 6 carbon atoms, such as acetylamino and propionylamino, benzoylamino, amino, alkylamino having 1 to 4 carbon atoms, phenylamino, alkoxycarbonyl having 1 to 4 carbon atoms in the alkoxy radical, nitro, cyano, trifluoromethyl, halogen, such as fluorine, chlorine and bromine, sulfamoyl, carbamoyl, ureido, hydroxyl, carboxyl, sulfomethyl and sulfo.

The same applies to the radicals $D_1$, $D_2$ and K in the formulae (4) and (5). An azo dye radical D in the formula (3) contains as substituents in particular methyl, ethyl, methoxy, ethoxy, acetylamino, benzoylamino, amino, ureido, hydroxyl, carboxyl, halogen, sulfomethyl or sulfo.

Also possible are reactive dyes in which one of the reactive radicals of the formulae (1a), (1b) or (2) or both are bonded to the chromophor via a radical of the formula

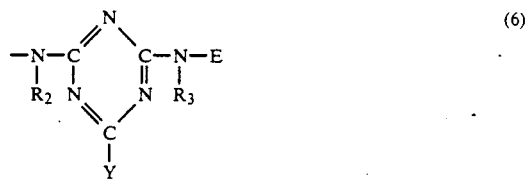

The radical of the formula (1a), (1b) or (2) is bonded to E; E is a substituted or unsubstituted aliphatic or aromatic bridge member. The bridge member E is preferably an alkylene or arylene radical. For instance, E can be a long (for example of 10 or more carbon atoms) or shorter, straight-chain or branched alkylene radical; it can be in particular an alkylene radical having 2 to 6 carbon atoms, for example ethylene, propylene, butylene, hexylene or cyclohexylene. An arylene radical E is for example a naphthalene radical, the radical of a biphenyl or of stilbene or in particular a phenylene radical. The radical E can contain further substituents, for example halogen atoms, such as fluorine, chlorine and bromine, alkyl groups having 1 to 4 carbon atoms, such as methyl, ethyl and propyl, alkoxy groups having 1 to 4 carbon atoms, such as methoxy, ethoxy, propyloxy and isopropyloxy, carboxyl or sulfo. $R_2$ and $R_3$, independently of each other, are hydrogen or a substituted or unsubstituted $C_{1-4}$-alkyl radical; and Y is a halogen atom, a substituted or unsubstituted amino group, hydroxyl or an alkoxy, aryloxy, alkylthio or arylthio group.

The invention also provides f) reactive dyes of the formula

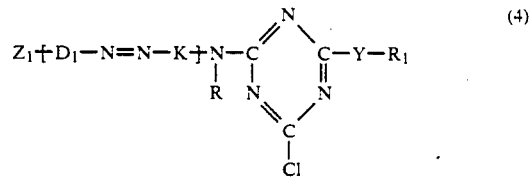

in which $D_1$ is a hydroxyl-free radical of a diazo component of the benzene or naphthalene series, K is the radical of a coupling component of the benzene or naphthalene series or of the heterocyclic series, $Z_1$ is vinylsulfonyl, β-chloroethylsulfonyl, β-sulfatoethylsulfonyl, β-acetoxyethylsulfonyl or β-chloroethylsulfonylbutyrylamino, R is hydrogen, methyl or ethyl, Y is oxygen or sulfur and $R_1$ is $C_{1-4}$-alkyl or $C_{1-4}$-alkoxy-$C_{1-4}$-alkyl; and g) reactive dyes of the formula

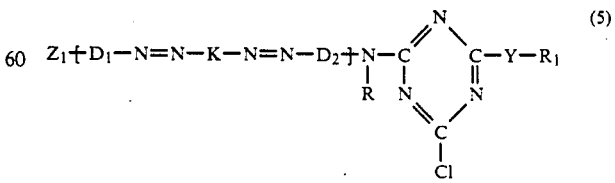

in which $D_1$ and $D_2$ are each a radical of a diazo component of the benzene or naphthalene series, K is the radical of a coupling component of the naphthalene series, $Z_1$ is vinylsulfonyl, β-chloroethylsulfonyl, β-sulfatoethylsulfonyl, β-acetoxyethylsulfonyl or β-chloroethylsulfonylbutyrylamino, R is hydrogen, methyl or ethyl, Y is oxygen or sulfur, and $R_1$ is $C_{1-4}$-alkyl or $C_{1-4}$-alkoxy-$C_{1-4}$-alkyl, and $D_2$ is bonded in ortho-position relative to an amino group of K.

The radicals of the formulae (1a), (1b) and (2) are reactive radicals which can undergo reaction in the manner of a nucleophilic addition and in the manner of a nucleophilic substitution.

Fibre-reactive compounds are to be understood as meaning those which can react with the hydroxyl groups of cellulose, with the amino, carboxyl, hydroxyl and thiol groups of wool and silk or with the amino and possibly carboxyl groups of nylons to form covalent chemical bonds.

Reactive dyes which can be used according to the invention can be prepared by condensing 2,4,6-trichloro-s-triazine(cyanuric chloride) with an aliphatic alcohol or thiol, and reacting the primary condensation product of the formula

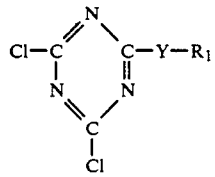

(7)

in which Y and $R_1$ are as defined under the formula (2), with an amino-containing dye or dye precursor, or converting the resulting intermediate into the desired final dye and if desired including a further conversion reaction. In this process of preparation, the amino-containing dye or dye precursor or one of the other components required for preparing the reactive dye needs to contain at least one radical of the formula (1a) or (1b). In certain circumstances, when the dye contains an acyl group, for example a chlorosulfonyl or chlorotriazinyl group, the radical of the formula (1a) or (1b) can also be introduced by condensation with an amine which contains a radical of the formula (1a) or (1b).

Thus the starting materials used are dyes which already contain a radical of the formula (1a) or (1b) and the group —N(R)H is acylated with the dichlorotriazine of the formula (7), or are appropriate precursors, for example a diazo component of the formula

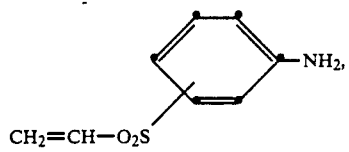

which are coupled onto a coupling component which contains a group —N(R)H and the —N(R)H group is acylated with the dichlorotriazine of the formula (7) before or after the coupling. In the embodiment described above, the acylatable group —N(R)H can also be present in the diazo component, and correspondingly the radical of the formula (1a) or (1b) in the coupling component. In this case the diazo component used is in particular 1,3-phenylenediamine-4-sulfonic acid, 1,4-phenylenediamine-2-sulfonic acid, 1,4-phenylenediamine-2,5-disulfonic acid or 1,3-phenylenediamine-4,6-disulfonic acid. If desired, use is made of appropriate acetylamino or nitro compounds in which the acetylamino or nitro group is converted by hydrolysis or reduction respectively into the $H_2N$ group before the condensation with the dichlorotriazine of the formula (7). The position of the reactive radicals in the completed azo dye is thus not unalterably tied to certain starting components—diazo or coupling component. The radical of the formula (1a) or (1b) and the radical of the formula (2) can also each be bonded to a diazo component, for example in diazo dyes of the type $D_1 \rightarrow M \leftarrow D_2$ 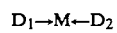

Furthermore, the two reactive radicals can also be bonded to one and the same component, for example by using a non-fibre-reactive diazo component and a coupling component of the formula

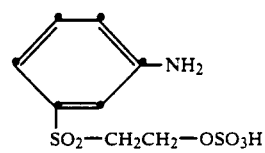

and acylating the —$NH_2$ group with the dichlorotriazine of the formula (7) after the coupling.

The process variant in which the starting materials used are dye precursors is suitable for preparing reactive dyes which are composed of two or more than two components. Examples of such dyes composed of two or more than two components are: monoazo, disazo, trisazo, metal complex azo, formazan and azomethine dyes. The reactions involved in the preparation of the final dyes from precursors are usually couplings which lead to azo dyes.

In principle, it is possible to prepare reactive dyes of all dyeing classes in a manner known per se or analogously to known procedures by starting from precursors or intermediates for dyes which contain fibre-reactive radicals as does the formulae (1a) or (1b) or (2) or introducing these fibrereactive radicals into suitable intermediates having dye character.

Another advantageous method consists in first preparing a dye which contains a precursor of the reactive radical and then subsequently converting this precursor into the final stage, for example by esterification or an addition reaction. For example, it is possible to prepare a dye which contains an HO—$CH_2CH_2$—$SO_2$— radical and to react the intermediate with sulfuric acid before or after the acylation, so that the hydroxyl group is converted into a sulfato group; or to use an analogous dye having an $H_2C$=CH—$SO_2$— group and to add onto the intermediate thiosulfuric acid to form an $HO_3SS$—$CH_2CH_2$—$SO_2$— radical. The hydroxyl group in a dye or a suitable precursor is sulfated for example by reaction with concentrated sulfuric acid at 0° C. to a moderately elevated temperature. The sulfation can also be effected by reaction of the hydroxy compound with 2 equivalents of chlorosulfonic acid per hydroxyl group in a polar organic solvent, such as N-methylpyrrolidone, at 10°–80° C. The sulfation is preferably effected by adding the compound in question to sulfuric acid monohydrate at temperatures between 5° and 15° C. The introduction of another radical detachable under alkaline conditions, for X, into a dye or an intermediate in place of the sulfato group, for example a thiosulfato group, is effected in a manner known per se.

It is also possible for elimination reactions to be included in the synthesis. For example, reactive dyes which contain sulfatoethylsulfonyl radicals can be treated with acid-eliminating agents, such as sodium hydroxide, and the sulfatoethylsulfonyl radicals convert into vinylsulfonyl radicals.

The above method of preparation via an intermediate of the reactive radical proceeds in many cases to a uniform product and to completion.

If groups capable of metal complex formation are present in the reactive dyes prepared, the reactive dyes can also be subsequently metallised.

Since the individual abovementioned process steps can be carried out in various orders, there are various possible process variants. In general, the reaction is carried out in successive steps in which the sequence of the elementary reactions between the individual reaction components is advantageously selected in accordance with the particular conditions. Which elementary reaction is advantageously carried out first varies from case to case and depends in particular on the solubility of the amino compounds involved and on the basicity of the amino groups to be acylated. The acylation of the amino-containing dyes or dye precursors with the dichlorotriazine of the formula (7) is effected in a manner known per se, preferably in aqueous solution or suspension and in the presence of alkaline, acid-binding agents, for example aqueous alkali metal hydroxides, carbonates or bicarbonates.

The most important process variants are described in the illustrated embodiments.

There now follow specific examples of possible starting materials which can be used for preparing the reactive dyes.

Possible amino-containing dyes are in particular dyes of the following structural types:

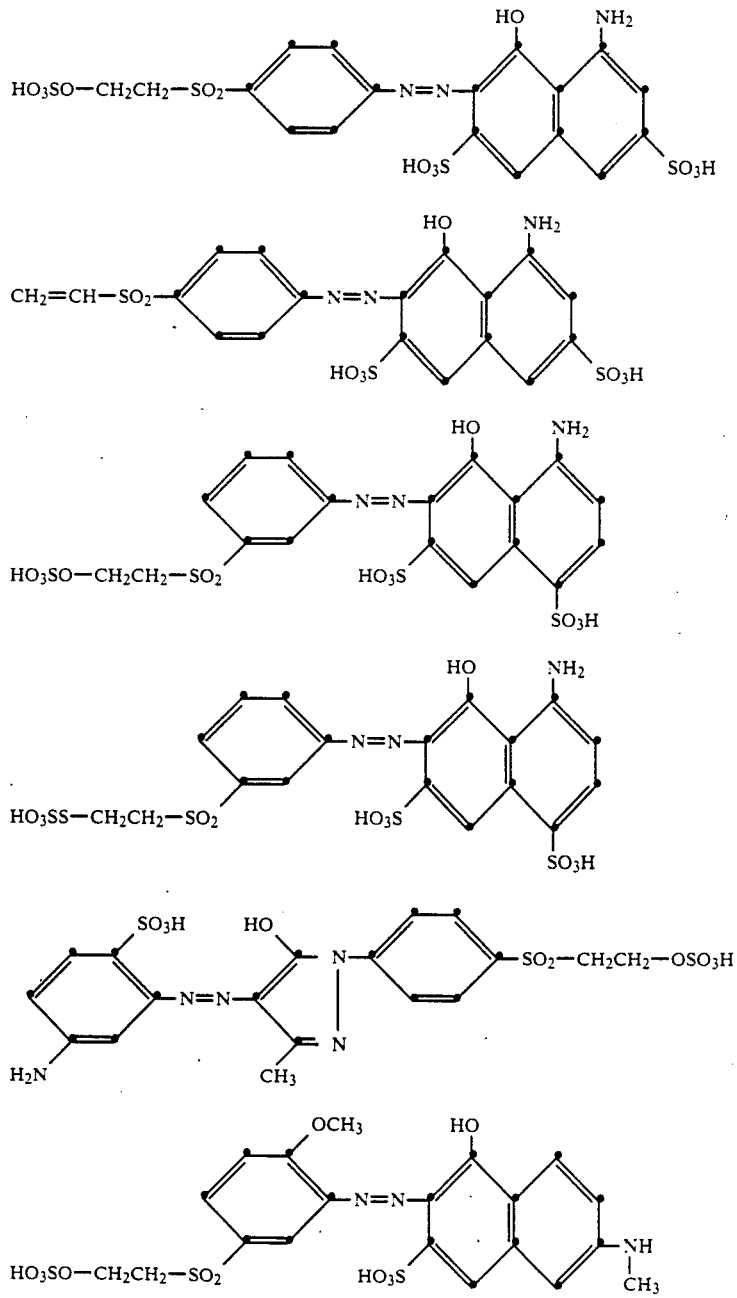

-continued
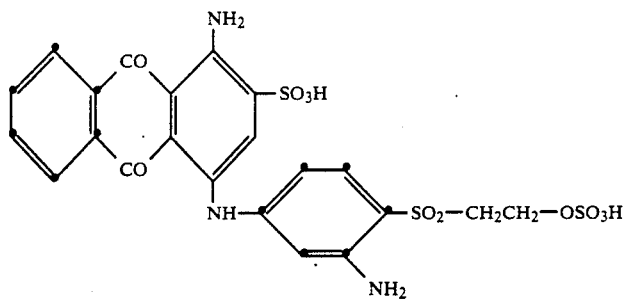
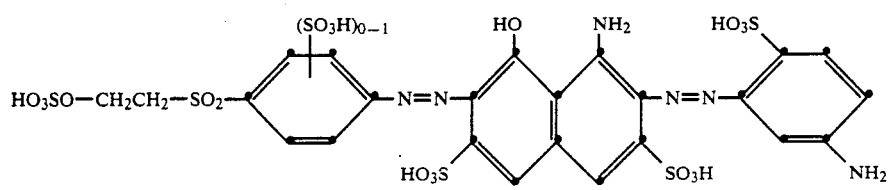
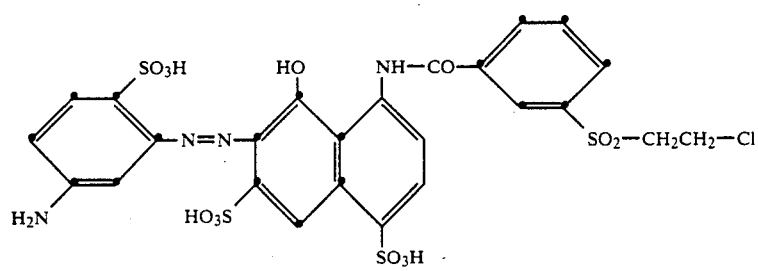
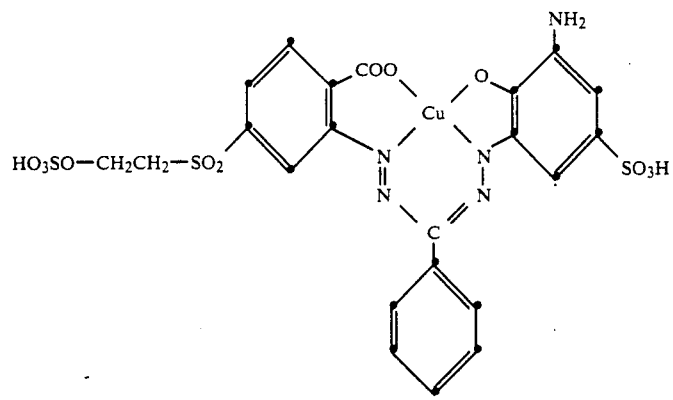
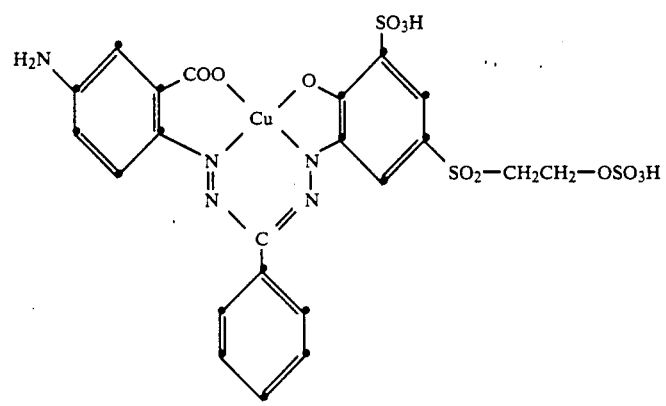

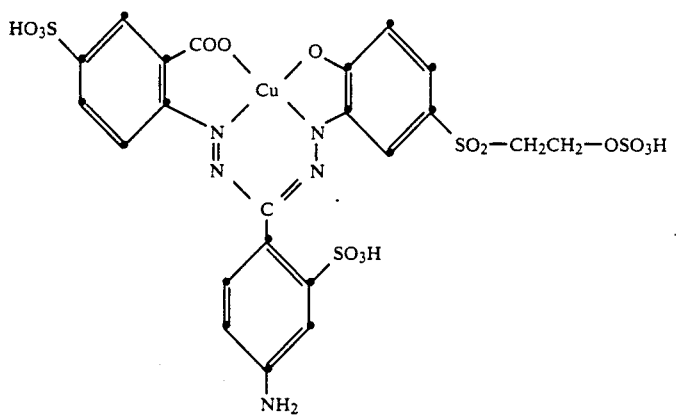
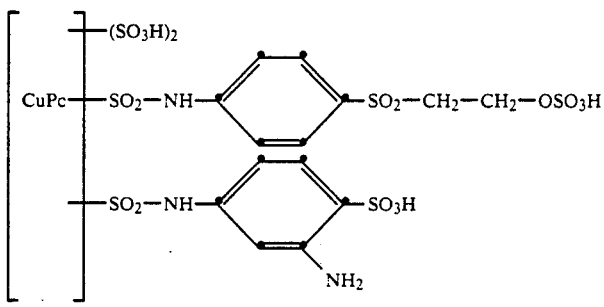
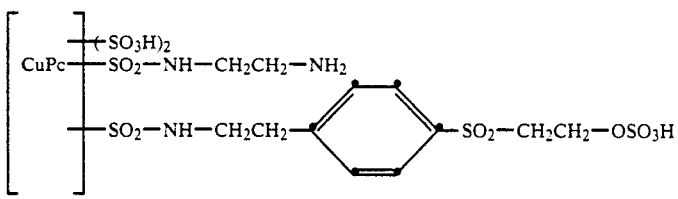
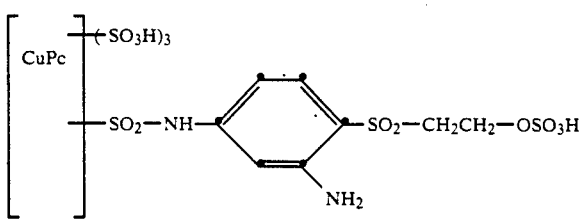
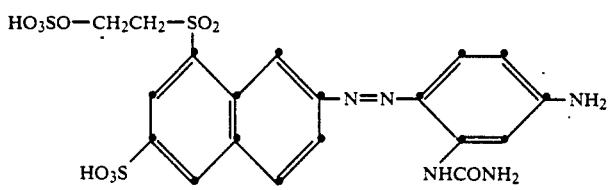
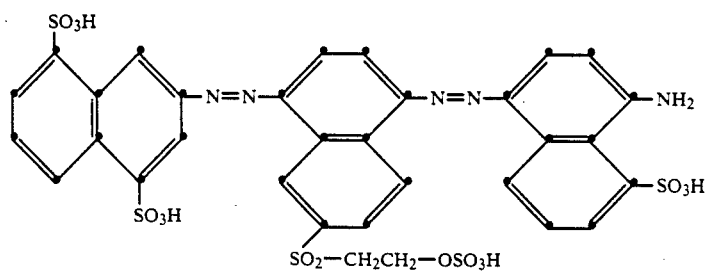

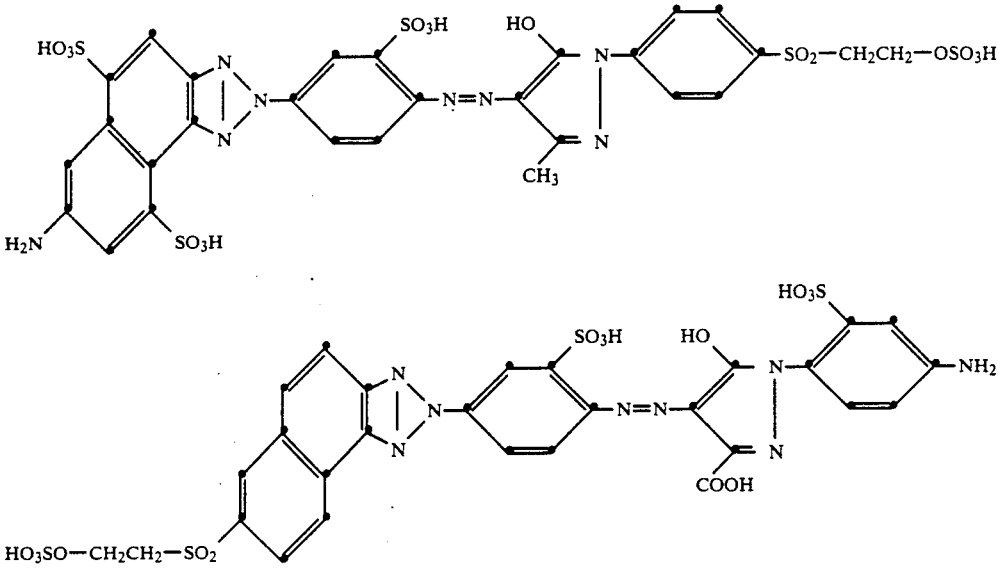

If the starting materials used for preparing the preferred reactive dyes of the formula (3) in which D is the radical of an azo dye are not completed amino dyes, for example those of the type described above, but dye precursors, i.e. the diazo coupling components, one of the two components needs to have at least one acylatable amino group and the other at least one radical of the formula (1a) or (1b). Possible diazo components are chiefly suitable compounds from the aminobenzene or aminonaphthalene series, for example those which are contained in the azo dyes of the abovementioned formulae, such as 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino 2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (benzidine), 3,3'-dimethylbenzidine, 3,3'-dimethoxybenzidine, 3,3'-dichlorobenzidine, 3,3'-dicarboxylbenzidine, 3,3'-dicarboxymethoxybenzidine, 2,2'-dimethylbenzidine, 4,2'-diaminodiphenyl (diphenyline), 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 3-(3'- or 4'-aminobenzoylamino)-1-aminobenzene-6-sulfonic acid, 1-(4'-aminobenzoylamino)-4-aminobenzene-2,5-disulfonic acid, 1,4-diaminobenzene-2-carboxylic acid, 1,3-diaminobenzene-4-carboxylic acid, 1,2-diaminobenzene-4-carboxylic acid 1,3-diaminobenzene-5-carboxylic acid, 1,4-diamino-2-methylbenzene, 4,4'-diaminodiphenyl oxide, 4,4'-diaminodiphenyl urea-2,2'-disulfonic acid, 4,4'-diaminodiphenyloxyethane-2,2'-disulfonic acid, 4,4'-diaminostilbene-2,2'-disulfonic acid, 4,4'-diaminodiphenylethane-2,2'-disulfonic acid, 2-amino-5-aminomethylnaphthalene-1-sulfonic acid, 2-amino-5-aminomethylnaphthalene-1,7-disulfonic acid, 1-amino-4-methoxy-5-aminomethylbenzene-6-sulfonic acid, 1,3,5-triaminobenzene.

Aromatic amines which can serve as diazo components for preparing the monoazo or disazo dyes and which contain a radical of the formula (1a) or (1b) bonded once or twice are for example:

1-Amino-4-β-sulfatoethylsulfonylbenzene, 1-amino-4-β-thiosulfatoethylsulfonylbenzene, 1-amino-4-vinylsulfonylbenzene, 1-amino-4-β-chloroethylsulfonylbenzene, 1-amino-3-β-sulfatoethylsulfonylbenzene, 1-amino-3-vinylsulfonylbenzene, 1-amino-2-methoxy-5-β-sulfatoethylsulfonylbenzene, 1-amino-2-methoxy-5-β-thiosulfatoethylsulfonylbenzene, 1-amino-2-methoxy-5-vinylsulfonylbenzene, 1-amino-4-methoxy-3-β-sulfatoethylsulfonylbenzene, 1-amino-4-methoxy-3-β-vinylsulfonylbenzene, 1-amino-2,5-dimethoxy-4-β-sulfatoethylsulfonylbenzene, 1-amino-2,5-dimethoxy-4-vinylsulfonylbenzene, 1-amino-2-methoxy-4-β-sulfatoethylsulfonyl-5-methylbenzene, 1-amino-2-methoxy-4-vinylsulfonyl-5-methylbenzene, 1-amino-3-β-sulfatoethylsulfonyl-6-carboxybenzene, 1-amino-3-vinylsulfonyl-6-carboxybenzene, 1-amino-4-β-sulfatoethylsulfonylbenzene-2-sulfonic acid, 1-amino-4-vinylsulfonylbenzene-2-sulfonic acid, 1-amino-5-vinylsulfonylbenzene-2,4-disulfonic acid, 1-amino-2-hydroxy-5-β-sulfatoethylsulfonylbenzene, 1-amino-2-hydroxy-4-β-sulfatoethylsulfonylbenzene, 1-amino-2-hydroxy-5-β-sulfatoethylsulfonylbenzene-3-sulfonic acid, 1-amino-2-bromo-4-β-sulfatoethylsulfonylbenzene, 1-amino-2,6-dichloro-4-β-sulfatoethylsulfonylbenzene, 1-amino-2,4-di-(β-sulfatoethylsulfonyl)-benzene, 1-amino-2,4-di-(β-sulfatoethylsulfonyl)-5-chlorobenzene, 1-amino-2,4-di-(β-thiosulfatoethylsulfonyl)-5-chlorobenzene, 1-amino-2,4-di-(vinylsulfonyl)-benzene, 1-amino-2,4-di-(vinylsulfonyl)-5-chlorobenzene, 1-amino-2,4-di-(β-acetoxyethylsulfonyl)-benzene, 1-amino-2,4-di-(β-acetoxyethylsulfonyl)-5-chlorobenzene, 2-amino-8-β-sulfatoethylsulfonylnaphthalene, 2-amino-6-β-sulfatoethylsulfonylnaphthalene, 2-amino-6β-sulfatoethylsulfonylnaphthalene-1-sulfonic acid, 2-amino-8-β-sulfatoethylsulfonylnaphthalene-6-sulfonic acid, 2-amino-6,8-di-(β-sulfatoethylsulfonyl)-naphthalene.

Further examples are the corresponding β-hydroxy compounds which can be used as precursors, such as: 1-amino-4-β-hydroxyethylsulfonylbenzene, 1-amino-3-β-hydroxyethylsulfonylbenzene, 1-amino-2,4-di-(β-hydroxyethylsulfonyl)-benzene and 1-amino-2,4-di-(β-hydroxyethylsulfonyl)-5-chlorobenzene.

If the diazo component to be used is not a diamine but an aminoacetylamino compound from which subsequently the acetyl group is reeliminated by hydrolysis, as mentioned above in the explanation of the process, the monoacetyl compounds of the abovementioned diazo components, for example 1-acetylamino-3-aminobenzene-4-sulfonic acid or 1-acetylamino-4-aminobenzene-3-sulfonic acid, are possible.

The coupling components are in particular suitable compounds of the aminobenzene and naphthalene series, for example anilines, N-monosubstituted anilines, m-phenylenediamine derivatives, aminonaphthalenes, naphthols, aminonaphthalenesulfonic acid, naphtholsulfonic acids or aminonaphtholsulfonic acids, and also pyrazolones, aminopyrazoles, aminopyridines, hydroxypyridines/pyridones, aminopyrimidines, hydroxypyrimidines, indoles, barbituric acid derivatives or acetoacetarylides. Specific examples are: 1-amino-3-methylbenzene, 1-amino-2-methoxy-5-methylbenzene, 1-amino-2,5-dimethylbenzene, 3-aminophenyl urea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 2-amino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl or 2-ethylamino-8-hydroxynaphthalene-6-sulfonic acid, 2-amino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-(4'-aminobenzoylamino)-8-hydroxynaphthalene-3,6- or -4,6-disulfonic acid, 2-(4'-amino-3'-sulfophenylamino)-5-hydroxynaphthalene-7-sulfonic acid, 1-amino-8-hydroxynaphthalene-4-sulfonic acid, 2,4,6-triamino-3-cyanopyridine, 1-β-aminoethyl-3-cyan-4-methyl-6-hydroxypyrid-2-one, 1-γ-aminopropyl-3-sulfomethyl-4-methyl-6-hydroxypyrid-2-one, 1,3-diaminobenzene, 1-amino-3-(N,N-di-β-hydroxyethylamino)-benzene, 1-amino-3-(N,N-di-β-sulfatoethylamino)benzene, 1-amino-3-(N,N-di-β-hydroxyethylamino)-4-methoxybenzene, 1-amino-3-(N,N-di-β-sulfatoethylamino)-4-methoxybenzene, 1-amino-3-sulfobenzylaminobenzene, 1-amino-3-sulfobenzylamino-4-chlorobenzene, 1-amino-3-(N,N-di-sulfo-benzylamino)-benzene, 1-(3'-aminophenyl)-3-methyl-5-pyrazolone and 1-(aminophenyl)-3-carboxy-5-pyrazolones which can be substituted in the phenyl nucleus by chlorine, methyl, methoxy, nitro or sulfo, such as 1-(2'-sulfo-4'-aminophenyl)-3-carboxypyrazol-5-one.

If one of the two components contains both reactive groups at the same time or these can be introduced into the component in question, such as in the case of coupling components of the formulae

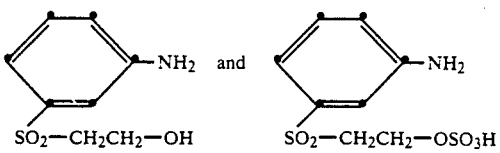

the other component, in this case the diazo component, can also be non-reactive. Examples are: aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, dichlorobenzene, 1-amino-2,5-dimethylbenzene, 1-amino-3-methyl-6-methoxybenzene, 1-amino-2-methoxy-4-nitrobenzene, 1-aminobiphenyl, 2-aminodiphenylether, 1-aminobenzene-2-, or -3- or -4-sulfonamide, 1-aminobenzene-2-, -3- or -4-carboxylic acid, dehydrothio-p-toluidine-sulfonic acid, 1-amino-3-trifluoromethylbenzene-6-sulfonic acid, 1-aminobenzene-2-, -3- or -4-sulfonic acid, 1-aminobenzene-2,4- and 2,5-disulfonic acid, 1-amino-4-methylbenzene-2-sulfonic acid, 1-amino-3-methylbenzene-6-sulfonic acid, 1-amino-6-methylbenzene-3or -4-sulfonic acid, 1-amino-2-carboxybenzene-4-sulfonic acid, 1-amino-4-carboxybenzene-2-sulfonic acid, 1-amino-4or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3- or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-6-sulfonic acid, 1-amino-2,5-dimethoxysulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 2-aminonaphthalene-3,6- or -5,7-disulfonic acid, 1-aminonaphthalene-3,6- or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonylbenzene, 1-amino-2-hydroxy-6-nitronaphthalene-6-sulfonic acid, 2-amino-1-hydroxynaphthalene-4,8-disulfonic acid, 4-aminoazobenzene-3,4'-disulfonic acid, 3-methoxy-4-amino-6-methylazobenzene-2',4'-disulfonic acid, 3-methoxy-4-amino-6-methylazobenzene-2',5'-disulfonic acid.

The diazotisation of the intermediates containing a diazotisable amino group is generally effected by the action of nitrous acid in aqueous mineral acid solution at a low temperature, and the coupling at weakly acid, neutral or weakly alkaline pH.

The condensation of the dichlorotriazine of the formula (7) with the diazo components or the coupling components or with acylatable monoazo or disazo intermediates or with the amino-containing dyes or their precursors is preferably effected in aqueous solution or suspension at a low temperature and in weakly acid, neutral or weakly alkaline pH. The hydrogen chloride freed in the course of the condensation is advantageously continuously neutralised by the addition of aqueous alkali metal hydroxides, carbonates or bicarbonates. The condensations of 2,4,6-trichloro-s-triazine with the aliphatic alcohols or thiols are preferably carried out in organic solvents, for example the alcohols in question.

Suitable aliphatic alcohols and thiols are for example: methanol, ethanol, propanol, isopropanol, n-butanol, isobutanol, sec.-butanol, tert.-butanol, hexanol, cyclohexanol, β-methoxyethanol, β-ethoxyethanol, γ-methoxypropanol, γ-ethoxypropanol, β-ethoxy-β-ethoxyethanol, glycolic acid, methanethiol, ethanethiol, propanethiol, isopropanethiol, n-butanethiol and thioglycolic acid.

The reactive dyes used according to the invention are suitable for dyeing and printing a very wide variety of materials, such as silk, leather, wool, nylon fibres and polyurethanes, and in particular cellulose-containing fibre materials of any kind. These fibre materials are for example the natural cellulose fibre, such as cotton, linen and hemp, and also wood pulp and regenerated cellulose. The reactive dyes are also suitable for dyeing and printing hydroxyl-containing fibres which are contained in blend fabrics, for example blends of cotton with polyester fibres or polyamide fibres.

The dyes used according to the invention can be applied to and be fixed on the fibre in various ways, in particular in the form of aqueous dye solutions and print pastes.

To carry out the process according to the invention in the alkaline pH range, the alkaline acid-binding agents used are for example sodium hyroxide, potassium hydroxide or any alkali metal salt of any weak acid, such as sodium carbonate or bicarbonate, trisodium phosphate, disodium phosphate, sodium silicate or sodium trichloroacetate qr mixtures of these acid-binding agents.

The dyeing liquors and print pastes containing the dye and the acid-binding agent can be applied to the material to be dyed within a wide temperature range, preferably at room temperature, 15° to 30° C., or at temperatures of up to 60° C. The most convenient procedure is to impregnate the fibre material with the dyeing liquors, which can contain neutral salts, and to squeeze off, for example in conventional manner by means of a pad-mangle, and to subject the fibre material, if desired after preceding intermediate drying, for the purpose of fixing the dyes, to an alkali treatment or a heat treatment in the presence of alkali. A similar procedure is used to produce prints by printing the fibre material with the stated print pastes, then drying the fibre material and subjecting it to a heat treatment to fix the dyes.

If the dyeing method used is the exhaust dyeing method, the dyebath contains one or more of the above-mentioned acid-binding agents and can, if desired, also contain the customary additives such as inorganic salts, urea or other assistants mentioned hereinafter. The goods are impregnated with the aqueous dye solutions which can contain salt, and the dyes are fixed after an alkali treatment or in the presence of alkali, if desired under the action of heat.

Depending on the concentration and the nature of the acid-binding agent it is also possible to carry out the fixing of the dyes at room temperature or at a somewhat elevated temperature, for example at 20° to 60° C. In this so-called cold pad-batch process, the procedure is for example to apply the dye on a pad-mangle together with the alkali and then to fix the dye at room temperature by storing the impregnated or printed moist goods for a plurality of hours.

The fixing of the dyeings and prints in the alkali range by means of heat can be effected using various methods customary in the art, for example by steaming with saturated steam at about 100° to 103° C. (pad-steam method) or with superheated steam at temperatures of up to 150° C., with hot air at temperatures of 120° to 230° C. (thermofixing method), by means of infrared irradiation, by passing through hot highly salt-containing solutions, by means of hot vapours of inert organic solvents or by passing the padded or printed cloth over a number of hot rolls.

The fixing is followed by thorough rinsing of the dyeings and prints with cold and hot water, if desired in the presence of an agent which acts like a dispersant and promotes the diffusion of the unfixed portions.

The dyeing liquors and print pastes, in addition to the alkali, can contain the generally customary additives, the solutions for example inorganic salts, such as alkali metal chlorides or alkali metal sulfates, urea, alginate thickenings, water-soluble cellulose alkyl ethers and dispersants and levelling assistants, and the print pastes for example urea, sodium-m-nitrobenzenesulfonate and the customary thickeners, such as methylcellulose, starch ether, emulsion thickenings or preferably an alginate, for example sodium alginate.

The alkaline acid-binding agent can also be applied to the fibre material, for example by spraying or padding with an aqueous solution of the agent, before or after the application of the dyeing liquors or print pastes which then do not contain this agent. The solutions of these agents can contain generally customary additives, such as those already mentioned above. If these agents are applied to the material to be dyed at the same time as the dye, it is advantageous to dissolve them in the dyeing liquor or in the print paste containing the dye.

The process according to the invention is preferably carried out as an exhaust, cold pad-batch or pad-steam method.

The process according to the invention can be carried out as an exhaust dye method at low dyeing temperatures and only requires short steaming times as a pad-steam method. High degrees of fixation are obtained, the difference between the degree of exhaustion and the degree of fixation being small, i.e. the hydrolysis loss being small.

The dyeings and prints prepared with the dyes used according to the invention are distinguished by bright shades. In particular the dyeings and prints on cellulose fibre materials have a high tinctorial strength and a high fibre-dye bond stability not only in the acid but also in the alkali range and also a good light fastness and very good wet fast properties, such as wash, water, seawater, cross-dyeing and perspiration fastness properties, and a good pleating fastness, hot-press fastness and rub fastness.

The following examples serve to illustrate the invention. The temperatures are given in degrees centigrade.

The parts and percentages are by weight, unless otherwise stated. Parts by weight relate to parts by volume as the kilogramme relates to the liter.

The preparation of the monoazo or disazo intermediates has not been described in all cases in the following illustrated embodiments, but is immediately evident from the general description.

EXAMPLE 1

2 parts of the reactive dye of the formula

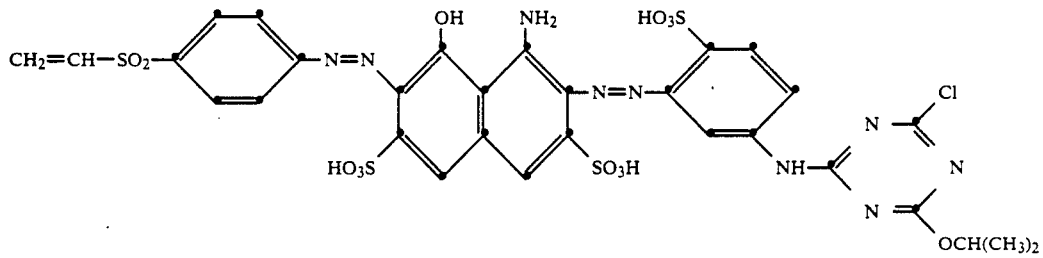

(Preparation described hereinafter) are dissolved in 400 parts of water; to this are added 1,500 parts of a solution which contains per liter 67 g of sodium chloride. 100 parts of a cotton fabric are introduced into this dyebath at 25° C. The temperature of the dyebath is raised to 40° C. in the course of 10 minutes. This is followed after a further 10 minutes by addition of 100 parts of a solution which contains per liter of water 20 g of sodium hydroxide and 100 g of calcined sodium carbonate. The temperature of the dyebath is maintained at 40° C. for a further 80 minutes.

The dyed fabric is then rinsed, is soaped off at the boil for a quarter of an hour with a nonionic detergent, is rinsed once more and dried. The result obtained is a navy dyeing having good fastness properties.

EXAMPLE 2

4 parts of the reactive dye used in Example 1 are dissolved in 50 parts of water. To this are added 50 parts of a solution which contains per liter of water 12 g of sodium hydroxide and 20 g of calcined sodium carbonate. The resulting solution is used to pad a cotton fabric in such a way that its weight increases by 70%, and it is then wound onto a beam. In this state the cotton fabric is stored at room temperature for 3 hours. The dyed fabric is then rinsed, is soaped off at the boil for a quarter of an hour with a nonionic detergent, is rinsed once more and dried. The result obtained is a blue dyeing having good fastness properties.

EXAMPLE 3

8 parts of the reactive dye used in Example 1 are dissolved in 80 parts of water. To this are added 20 parts of a solution which contains per liter 60 g of sodium hydroxide and 0.25 liter of sodium silicate (38° é). The resulting solution is used to pad a cotton fabric in such a way that its weight increases by 70%, and it is then wound onto a beam. In this state the cotton fabric is stored at roomtemperature for 10 hours. The dyed fabric is then rinsed, is soaped off at the boil for a quarter of an hour with a nonionic detergent, is rinsed once more and dried. The result obtained is a black dye having good fastness properties.

EXAMPLE 4

4 parts of the reactive dye used in Example 1 are dissolved in 50 parts of water. To this are added 50 parts of a solution which contains per liter 24 g of sodium hydroxide and 0.2 liter of sodium silicate (38° Bé). The resulting solution is used to pad a cotton fabric in such a way that its weight increases by 70%, and it is then wound onto a beam. In this state the cotton fabric is stored at room temperature for 6 hours. The dyed fabric is then rinsed, is soaped off at the boil for a quarter of an hour with a nonionic detergent, is rinsed once more and dried. The result obtained is a black dye having good fastness properties.

EXAMPLE 5

4 parts of the reactive dye used in Example 1 are dissolved in 50 parts of water. To this are added 50 parts of a solution which contains per liter 40 g of sodium carbonate and 400 g of urea. The resulting solution is used to pad a cotton fabric in such a way that its weight increases by 75%, and the fabric is then dried and thermofixed at 140° C. for 60 to 90 seconds. The dyed fabric is then rinsed, is soaped off at the boil for quarter of an hour with a nonionic detergent, is rinsed once more and dried. The result obtained is a blue dye having good fastness properties.

EXAMPLE 6

4 parts of the reactive dye used in Example 1 are dissolved in 100 parts of water with addition of 0.5 part of sodium m-nitrobenzenesulfonate. The resulting solution is used to impregnate a cotton fabric, so that its weight increases by 75%, and the fabric is then dried.

The fabric is then impregnated with a warm solution at 20° C. which contains per liter 6 g of sodium hydroxide and 300 g of sodium chloride, is squeezed off to a 75% weight increase, is steamed at 100 to 102° C. for 30 to 60 seconds, is soaped off in a 0.3% boiling solution of a nonionic detergent for quarter of an hour, is rinsed and is dried. The result obtained is a blue dyeing having good fastness properties.

EXAMPLE 7

7 parts of the reactive dye used in Example 1 are dissolved in 50 parts of water. To this are added 50 parts of a solution which contains per liter 24 g of sodium hydroxide, 0.04 litre of sodium silicate (38° Bé) and 200 g of urea. The resulting solution is used to pad a cotton fabric, so that its weight increases by 70%. The cotton fabric is dried in this state (for example by means of 90 seconds of dry heat at 100° C.) and is steamed at 102° C. in saturate steam for 30 to 60 seconds. The dyed fabric is then rinsed, is soaped off at the boil for a quarter of an hour with a nonionic detergent, is rinsed once more and is dried. The result obtained is a black dye having good fastness properties.

EXAMPLE 8

5 parts of the reactive dye used in Example 1 are sprinkled with high-speed stirring into 100 parts of a stock thickening containing 50 parts of 5% sodium alginate thickening, 36.5 parts of water, 10 parts of urea, 1 part of sodium m-nitrobenzenesulfonate and 2.5 parts of sodium hydrogencarbonate. The print paste thus obtained is used to print a cotton fabric, which is then dried and steamed at 102° C. in saturated steam for 8 minutes. The printed fabric is then rinsed, if desired soaped off at the boil and rinsed once more and subsequently dried. The result obtained is a black print having good fastness properties.

METHOD OF PREPARING THE REACTIVE DYE USED IN EXAMPLE 1

A mixture of 28.1 parts of diazotised 1-amino-4-($\beta$-sulfatoethylsulfonyl)-benzene with 300 parts of water is added at 0° to 5° C. to 69 parts of a solution in 600 parts of water of the coupling component of the formula

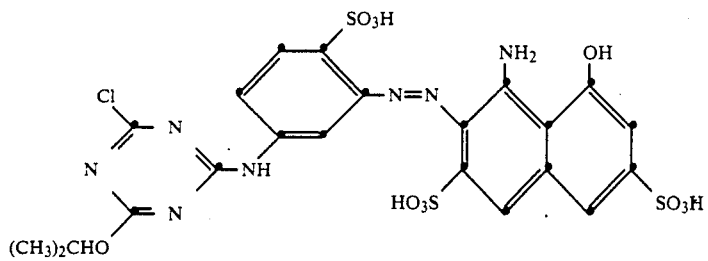

(prepared by acid coupling of diazotised 2-(3'-amino-4'-sulfophenylamino)-4-chloro-6-isopropoxy-1,3,5-triazine on 1-amino-8-hydroxynaphthalene-3,6-disulfonic acid). After full coupling reaction at pH 5.5 to 6.5 the pH of the reaction solution warmed to room temperature is maintained at 10 by continuous addition of dilute sodium hydroxide solution. After full elimination reaction the reaction solution is neutralised and the resulting reactive dye of the formula

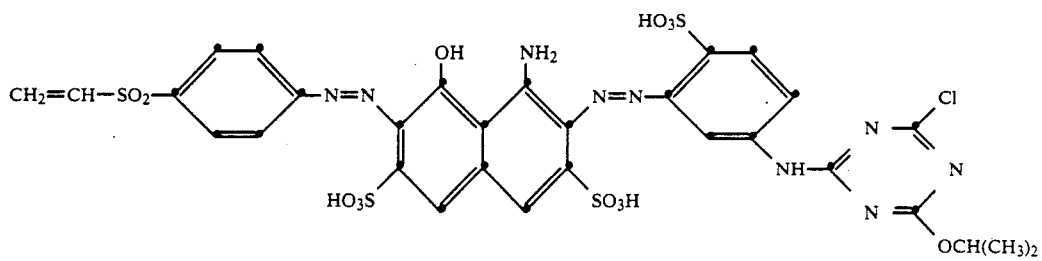

is salted out by sprinkling in sodium chloride, is filtered off and is dried.

Further reactive dyes which, if applied in accordance with the dyeing and printing methods described in the Examples, produce dyeings and prints respectively of the shade indicated in Table 1 column 4 and having good fastness properties are obtained when the diazotised diazo component indicated in column 2 is coupled under acid conditions onto 1-amino-8-hydroxynaphthalene-3,6-disulfonic acid in accordance with the indications of the preparative method and coupling the resulting monoazo compound onto the diazotised diazo component indicated in column 3.

TABLE 1

| No. | Diazo component | Diazo component | Shade of cotton |
|---|---|---|---|
| 1 | 2-(3'-Amino-4'-sulfophenyl-amino)-4-chloro-6-iso-propoxy-1,3,5-triazine | 1-Amino-4-($\beta$-acetoxy-ethyl-sulfonyl)-benzene | blue |
| 2 | 2-(3'-Amino-4'-sulfophenyl-amino)-4-chloro-6-iso-propoxy-1,3,5-triazine | 1-Amino-5-(4-($\beta$-chloro-ethyl-sulfonyl)-butyrylamino)-benzene-2-sulfonic acid | blue |
| 3 | 2-(3'-Amino-4'-sulfophenyl-amino)-4-chloro-6-iso-propoxy-1,3,5-triazine | 1-Amino-4-(4-($\beta$-chloro-ethyl-sulfonyl)-butyrylamino)-benzene-2-sulfonic acid | blue |
| 4 | 2-(3'-Amino-4'-sulfophenyl-amino)-4-chloro-6-($\beta$-ethoxy-ethoxy-1,3,5-triazine | 1-Amino-4-($\beta$-sulfato-ethylsulfonyl)-benzene-2-sulfonic acid | blue |
| 5 | 2-(3'-Amino-4'-sulfophenyl-amino)-4-chloro-6-($\beta$-ethoxy-ethoxy-1,3,5-triazine | 1-Amino-4-($\beta$-acetoxy-ethylsulfonyl)-benzene | blue |
| 6 | 2-(3'-Amino-4'-sulfonphenyl-amino)-4-chloro-6-($\beta$-ethoxy-ethoxy-1,3,5-triazine | 1-Amino-5-(4-($\beta$-chloro-ethylsulfonyl)-butyrylamino)-benzene-2-sulfonic acid | blue |
| 7 | 2-(3'-Amino-4'-sulfophenyl-amino)-4-chloro-6-($\beta$-ethoxy- | 1-Amino-4-(4-($\beta$-chloro ethyl-sulfonyl)- | blue |

TABLE 1-continued

| No. | Diazo component | Diazo component | Shade of cotton |
|---|---|---|---|
| | ethoxy-1,3,5-triazine | butyrylamino)-benzene-2-sulfonic acid | |
| 8 | 2-(4'-Amino-3'-sulfophenyl-amino)-4-chloro-6-iso propoxy-1,3,5-triazine | 1-Amino-4-(β-sulfato-ethyl-sulfonyl)-benzene | greenish blue |
| 9 | 2-(4'-Amino-3'-sulfophenyl-amino)-4-chloro-6-iso propoxy-1,3,5-triazine | 1-Amino-4-(β-acetoxy-ethyl-sulfonyl)-benzene | greenish blue |
| 10 | 2-(4'-Amino-3'-sulfophenyl-amino)-4-chloro-6-iso propoxy-1,3,5-triazine | 1-Amino-5-(4-(β-chloro-ethyl-sulfonyl)-butyrylamino)-benzene-2-sulfonic acid | greenish blue |
| 11 | 2-(4'-Amino-3'-sulfophenyl-amino)-4-chloro-6-iso propoxy-1,3,5-triazine | 1-Amino-4-(4-β-chloro-ethyl-sulfonyl)-butyrylamino)-benzene-2-sulfonic acid | greenish blue |
| 12 | 2-(4'-Amino-3'-sulfophenyl-amino)-4-chloro-6-(β-ethoxy-ethoxy)-1,3,5-triazine | 1-Amino-4-(β-sulfato-ethylsulfonyl)-benzene | greenish blue |
| 13 | 2-(4'-Amino-3'-sulfophenyl-amino)-4-chloro-6-(β-ethoxy-ethoxy)-1,3,5-triazine | 1-Amino-4-(β-acetoxy-ethylsulfonyl)-benzene | greenish blue |
| 14 | 2-(4'-Amino-3'-sulfophenyl-amino)-4-chloro-6-(β-ethoxy-ethoxy)-1,3,5-triazine | 1-Amino-5-(4-(β-chloro-ethylsulfonyl)-butyrylamino)-benzene 2-sulfonic acid | greenish blue |
| 15 | 2-(4'-Amino-3'-sulfophenyl-amino)-4-chloro-6-(β-ethoxy-ethoxy)-1,3,5-triazine | 1-Amino-4-(4-(β-chloro ethylsulfonyl)-butyrylamino)-benzene-2-sulfonic acid | greenish blue |
| 16 | 2-(4'-Amino-2',5'-di-sulfophenyl-amino)-4-4-chloro-6-isopropoxy-1,3,5-triazine | 1-Amino-4-(β-sulfato-ethylsulfonyl)-benzene-2-sulfonic acid | greenish blue |
| 17 | 2-(4'-Amino-2'-5'di-sulfophenyl-amino)-4-chloro-6-isopropoxy-1,3,5-triazine | 1-Amino-4-(β-acetoxy-ethylsulfonyl)-benzene | greenish blue |
| 18 | 2-(4'-Amino-2'-5'di-sulfophenyl-amino)-4-chloro-6-isopropoxy-1,3,5-triazine | 1-Amino-5-(4-(β-chloroethylsulfonyl)-butyrylamino)-benzene-2-sulfonic acid | greenish blue |
| 19 | 2-(4'-Amino-2'-5'di-sulfophenyl-amino)-4-chloro-6-isopropoxy-1,3,5-triazine | 1-Amino-4-(4-(β-chloroethylsulfonyl)-butyrylamino)-benzene-2-sulfonic acid | greenish blue |
| 20 | 2-(3'-Amino-4',6'-di-sulfophenylamino)-4-chloro-6-isopropoxy-1,3,5-triazine | 1-Amino-4-(β-sulfato-ethylsulfonyl)-benzene | blue |
| 21 | 2-(3'-Amino-4',6'-di-sulfophenylamino)-4-chloro-6-isopropoxy-1,3,5-triazine | 1-Amino-4-(β-acetoxy-ethylsulfonyl)-benzene | blue |
| 22 | 2-(3'-Amino-4',6'-di-sulfophenylamino)-4-chloro-6-isopropoxy-1,3,5-triazine | 1-Amino-5-(4-(β-chloro ethylsulfonyl)-butyrylamino)-benzene-2-sulfonic acid | blue |
| 23 | 2-(3'-Amino-4',6'-di-sulfophenylamino)-4-chloro-6-isopropoxy-1,3,5-triazine | 1-Amino-4-(4-(β-chloro-ethylsulfonyl)-butyrylamino)-benzene-2-sulfonic acid | blue |
| 24 | 2-(3'-Amino-4'-sulfo-phenylamino)-4-6-methylthio-1,3,5-triazine | 1-Amino-4-(β-sulfato-ethylsulfonyl)-benzene | blue |
| 25 | 2-(3'-Amino-4'-sulfo-phenylamino)-4-6-methylthio-1,3,5-triazine | 1-Amino-4-(β-acetoxy-ethylsulfonyl)-benzene | " |
| 26 | 2-(3'-Amino-4'-sulfo-phenylamino)-4-6-methylthio-1,3,5-triazine | 1-Amino-5-(4-(β-chloro-ethylsulfonyl)-butyryl-amino)-benzene-2-sulfonic acid | " |
| 27 | 2-(3'-Amino-4'-sulfo-phenylamino)-4-6-methylthio-1,3,5-triazine | 1-Amino-4-(4-(β-chloro ethyl-sulfonyl)-butyryl-amino)-benzene-2-sulfonic acid | " |
| 28 | 2-(4'-Amino-2',5'-di-sulfophenylamino)-4- | 1-Amino-4-(β-sulfato-ethylsulfonyl)-benzene- | greenish blue |

TABLE 1-continued

| No. | Diazo component | Diazo component | Shade of cotton |
|---|---|---|---|
|  | chloro-6-methylthio-1,3,5-triazine | 2-sulfonic acid |  |
| 29 | 2-(4'-Amino-2',5'-disulfophenylamino)-4-chloro-6-methylthio-1,3,5-triazine | 1-Amino-4-(β-acetoxy-ethylsulfonyl)-benzene | greenish blue |
| 30 | 2-(4'-Amino-2',5'-disulfophenylamino)-4-chloro-6-methylthio-1,3,5-triazine | 1-Amino-5-(4-(β-chloro-ethyl-sulfonyl)-butyryl-amino)-benzene-2-sulfonic acid | greenish blue |
| 31 | 2-(4'-Amino-2',5'-disulfophenylamino)-4-chloro-6-methylthio-1,3,5-triazine | 1-Amino-4-(4-(β-chloro-ethyl-sulfonyl)-butyryl-amino)-benzene-2-sulfonic acid | greenish blue |
| 32 | 2-(3'-Amino-4',6'-disulfophenylamino)-4-chloro-6-methylthio-1,3,5-triazine | 1-Amino-4-(β-sulfato-ethylsulfonyl)-benzene | blue |
| 33 | 2-(3'-Amino-4',6'-disulfophenylamino)-4-chloro-6-methylthio-1,3,5-triazine | 1-Amino-4-(β-acetoxy-ethylsulfonyl)-benzene | blue |
| 34 | 2-(3'-Amino-4',6'-disulfophenylamino)-4-chloro-6-methylthio-1,3,5-triazine | 1-Amino-5-(4-(β-chloro-ethylsulfonyl)-butyryl-amino)-benzene-2-sulfonic acid | " |
| 35 | 2-(3'-Amino-4',6'-disulfophenylamino)-4-chloro-6-methylthio-1,3,5-triazine | 1-Amino-4-(4-(β-chloro-ethyl-sulfonyl)-butyryl-amino)-benzene-2-sulfonic acid | " |

Further reactive dyes which, if applied in accordance with the dyeing and printing methods described in the Examples, produce dyeings and prints respectively in the shade indicated in Table 2 column 4 and having good fastness properties are obtained when the coupling component indicated in column 2 is acylated at room temperature at pH 6.5 with 1.1 equivalents of 2,4-dichloro-6-isopropoxy-1,3,5-triazine or with 1.1 equivalents of 2,4-dichloro-6-(β-ethoxyethoxy)-1,3,5-triazine or of 2,4-dichloro-6-methoxy-1,3,5-triazine or with 1.1 equivalents of 2,4-dichloro-6-methylthio-1,3,5-triazine and onto the acylation product thus obtained is coupled the diazotised diazo component indicated in column 3.

TABLE 2

| No. | Coupling component | Diazo component | Shade on cotton |
|---|---|---|---|
| 1 | 1-Amino-8-hydroxynaphthalene-3,6-disulfonic acid | 1-Amino-4-(β-sulfato-ethylsulfonyl)-benzene | red |
| 2 | 1-Amino-8-hydroxynaphthalene-3,6-disulfonic acid | 1-Amino-4-(β-acetoxy-ethylsulfonyl)-benzene | " |
| 3 | 1-Amino-8-hydroxynaphthalene-3,6-disulfonic acid | 1-Amino-5-(4-(β-chloro-ethylsulfonyl)-butyrylamino)-benzene-2-sulfonic acid | " |
| 4 | 1-Amino-8-hydroxynaphthalene-3,6-disulfonic acid | 1-Amino-4-(4-(β-chloro-ethylsulfonyl)-butyrylamino)-benzene 2-sulfonic acid | bluish red |
| 5 | 2-Amino-5-hydroxynaphthalene-7-sulfonic acid | 1-Amino-4-(β-sulfato-ethylsulfonyl)-benzene-2-sulfonic acid | orange |
| 6 | 2-Amino-5-hydroxynaphthalene-7-sulfonic acid | 1-Amino-4-(β-acetoxy-ethylsulfonyl)-benzene | orange |
| 7 | 2-Amino-5-hydroxynaphthalene-7-sulfonic acid | 1-Amino-5-(4-(β-chloro-ethylsulfonyl)-butyrylamino)-benzene-2-sulfonic acid | orange |
| 8 | 2-Amino-5-hydroxynaphthalene-7-sulfonic acid | 1-Amino-4-(4-(β-chloro-ethyl-sulfonyl)-butyrylamino)-benzene 2-sulfonic acid | scarlet |
| 9 | 1,3-diaminobenzene-4-sulfonic acid | 1-Amino-4-(β-sulfato-ethylsulfonyl)-benzene | yellow |

Further reactive dyes which, if applied in accordance with the dyeing and printing methods described in the Examples, produce dyeings and prints respectively in the shade indicated in Table 3 column 4 and having good fastness properties are obtained when the coupling component indicted in column 2is acylated at 0° C. and pH 6.5 with 1.1 equivalents of molten 4-(β-chloroethyl-sulfonyl)-butyryl chloride and the acylation product thus obtained is coupled onto the diazotised diazo component indicated in column 3.

TABLE 3

| No. | Coupling component | Diazo component | Shade on cotton |
|---|---|---|---|
| 1 | Amino-8-hydroxynaphthalene-3,6-disulfonic acid | 2-(3'-Amino-4'-sulfophenylamino)-4-chloro-6-isopropoxy-1,3,5-triazine | red |
| 2 | Amino-8-hydroxynaphthalene-3,6-disulfonic acid | 2-(3'-Amino-4'-sulfophenylamino)-4-chloro-6-(β-ethoxyethoxy)-1,3,5-triazine | " |
| 3 | Amino-8-hydroxynaphthalene-3,6-disulfonic acid | 2-(4'-Amino-3'-sulfophenylamino)-4-chloro-6-isopropoxy-1,3,5-triazine | bluish red |
| 4 | Amino-8-hydroxynaphthalene-3,6-disulfonic acid | 2-(4'-Amino-3'-sulfophenylamino)-4-chloro-6-(β-ethoxyethoxy)-1,3,5-triazine | " |
| 5 | Amino-8-hydroxynaphthalene-3,6-disulfonic acid | 2-(4'-Amino-2',5'-disulfophenylamino)-4-chloro-6-isopropoxy-1,3,5-triazine | " |
| 6 | Amino-8-hydroxynaphthalene-3,6-disulfonic acid | 2-(3'-Amino-4',6'-disulfophenylamino)-4-chloro-6-isopropoxy-1,3,5-triazine | red |
| 7 | 2-Amino-5-hydroxynaphthalene-7-sulfonic acid | 2-(3'-Amino-4'-sulfophenylamino)-4-chloro-6-isopropoxy-1,3,5-triazine | orange |
| 8 | 2-Amino-5-hydroxynaphthalene-7-sulfonic acid | 2-(3'-Amino-4'-sulfophenylamino)-4-chloro-6-(β-ethoxyethoxy)-1,3,5-triazine | " |
| 9 | 2-Amino-5-hydroxynaphthalene-7-sulfonic acid | 2-(4'-Amino-3'-sulfophenylamino)-4-chloro-6-isopropoxy-1,3,5-triazine | scarlet |
| 10 | 2-Amino-5-hydroxynaphthalene-7-sulfonic acid | 2-(4'-Amino-3'-sulfophenylamino)-4-chloro-6-(β-ethoxyethoxy)-1,3,5-triazine | " |
| 11 | 2-Amino-5-hydroxynaphthalene-7-sulfonic acid | 2-(4'-Amino-2',3'-disulfophenylamino)-4-chloro-6-isopropoxy-1,3,5-triazine | " |
| 12 | 2-Amino-5-hydroxynaphthalene-7-sulfonic acid | 2-(3'-Amino-4',6'-disulfophenylamino)-4-chloro-6-isopropoxy-1,3,5-triazine | orange |
| 13 | 1-Amino-8-hyroxynaphthalene-3,6-disulfonic acid | 2-(3'-Amino-4'-sulfophenylamino)-4-chloro-6-methylthio-1,3,5-triazine | red |
| 14 | 1-Amino-8-hyroxynaphthalene-3,6-disulfonic acid | 2-(4'-Amino-3'-sulfophenylamino)-4-chloro-6-methylthio-1,3,5-triazine | bluish red |
| 15 | 1-Amino-8-hydroxynaphthalene-3,6-disulfonic acid | 2-(4'-Amino-2',5'-disulfophenylamino)-4-chloro-6-methylthio-1,3,5-triazine | bluish red |
| 16 | 1-Amino-8-hydroxynaphthalene-3,6-disulfonic acid | 2-(3'-Amino-4',6'-disulfophenylamino)-4-chloro-6-methylthio-1,3,5-triazine | red |
| 17 | 2-Amino-5-hydroxynaphthalene-7-sulfonic acid | 2-(3'-Amino-4'-sulfophenylamino)-4-chloro-6-methylthio-1,3,5-triazine | orange |
| 18 | 2-Amino-5-hydroxynaphthalene-7-sulfonic acid | 2-(4'-Amino-3'-sulfophenylamino)-4-chloro-6-methylthio-1,3,5-triazine | scarlet |
| 19 | 2-Amino-5-hydroxynaphthalene-7-sulfonic acid | 2-(4'-Amino-2',5'-disulfophenylamino)-4-chloro-6-methylthio-1,3,5-triazine | " |
| 20 | 2-Amino-5-hydroxynaphthalene-7-sulfonic acid | 2-(3'-Amino-4',6'-disulfophenylamino)-4-chloro-6-methylthio-1,3,5-triazine | orange |

We claim:
1. A reactive dye of the formula

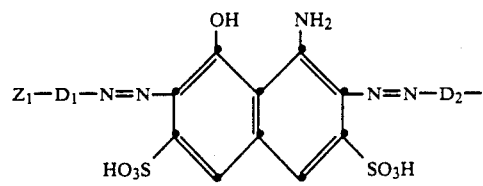

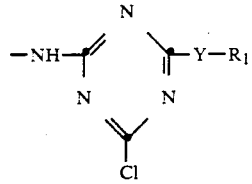

in which $D_1$ and $D_2$ are each phenylene unsubstituted or substituted by sulfo, $Z_1$ is vinylsulfonyl, β-chloroethylsulfonyl, β-sulfatoethylsulfonyl, β-acetoxyethylsulfonyl or β-chloroethylsulfonylbutyrylamino, Y is sulfur, and $R_1$ is $C_1$–$C_4$-alkyl or $C_1$–$C_4$-alkoxy-$C_1$–$C_4$-alyl.

2. A reactive dye according to claim 1 of the formula

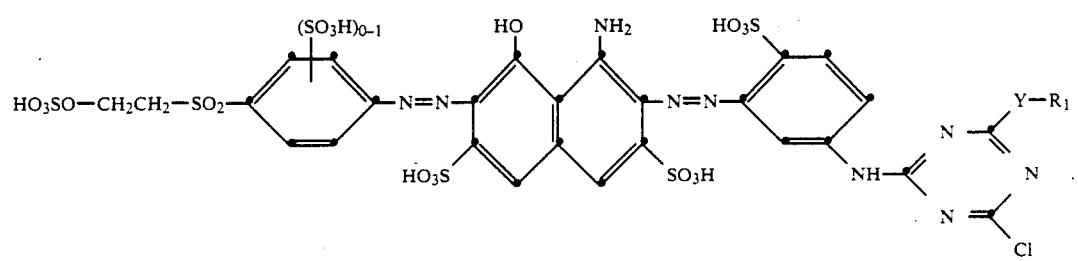

3. A reactive dye according to claim 2 of the formula

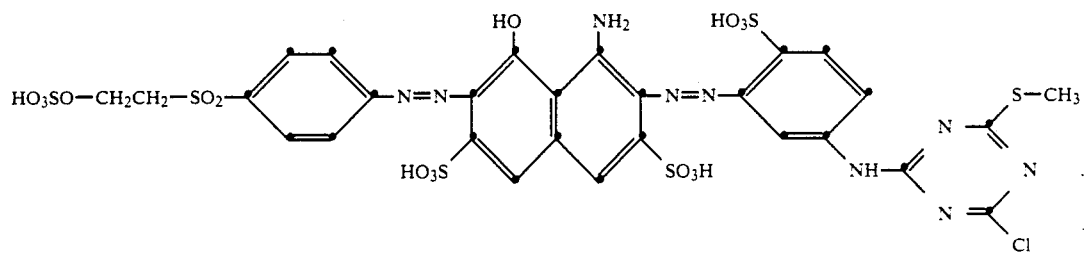

* * * * *